United States Patent
Yeh

(10) Patent No.: US 12,366,987 B2
(45) Date of Patent: Jul. 22, 2025

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Yen Chen Yeh, Hsinchu (TW)

(73) Assignee: PHISON ELECTRONICS CORP., Miaoli (TW)

(*) Notice: Subject to any disclaimer, the term of this patent is extended or adjusted under 35 U.S.C. 154(b) by 64 days.

(21) Appl. No.: 18/332,774

(22) Filed: Jun. 12, 2023

(65) Prior Publication Data

US 2024/0354024 A1 Oct. 24, 2024

(30) Foreign Application Priority Data

Apr. 24, 2023 (TW) .................................. 112115205

(51) Int. Cl.
*G06F 3/06* (2006.01)
*G06F 12/02* (2006.01)

(52) U.S. Cl.
CPC ............ *G06F 3/0647* (2013.01); *G06F 3/061* (2013.01); *G06F 3/0688* (2013.01); *G06F 12/0246* (2013.01)

(58) Field of Classification Search
None
See application file for complete search history.

(56) References Cited

U.S. PATENT DOCUMENTS

| 11,249,898 | B1* | 2/2022 | Kuo | G06F 12/0822 |
|---|---|---|---|---|
| 2013/0326125 | A1* | 12/2013 | Chang | G06F 12/0246 |
| | | | | 711/103 |
| 2018/0165009 | A1* | 6/2018 | Hsiao | G06F 3/0665 |
| 2019/0095116 | A1* | 3/2019 | Igahara | G06F 3/061 |
| 2019/0227715 | A1* | 7/2019 | Hong | G06F 3/0608 |
| 2020/0133843 | A1* | 4/2020 | Muchherla | G06F 12/0246 |
| 2020/0393964 | A1* | 12/2020 | Ke | G06F 3/061 |
| 2021/0073119 | A1* | 3/2021 | Amaki | G06F 3/0613 |
| 2023/0418501 | A1* | 12/2023 | Koo | G06F 3/0679 |

FOREIGN PATENT DOCUMENTS

| TW | I615710 | 2/2018 |
|---|---|---|
| TW | I741779 | 10/2021 |

* cited by examiner

*Primary Examiner* — Yaima Rigol
(74) *Attorney, Agent, or Firm* — JCIPRNET

(57) ABSTRACT

A memory management method, a memory storage device and a memory control circuit unit are disclosed. The method includes: activating a data merge operation; selecting a plurality of first-type physical units and a second-type physical unit from a rewritable non-volatile memory module to execute the data merge operation, wherein a data capacity of each first-type physical unit is less than a data capacity of each second-type physical unit; during a first execution period of the data merge operation, copying first data from a first physical unit in a stable state among the first-type physical units to the second-type physical unit; and during the first execution period, storing second data from a host system to a second physical unit not in the stable state among the first-type physical units.

21 Claims, 10 Drawing Sheets

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 112115205 filed on Apr. 24, 2023. The entirety of the above-mentioned patent application is hereby incorporated by reference herein and made a part of this specification.

BACKGROUND

Technical Field

The disclosure relates a memory management technology, and in particular relates to a memory management method, a memory storage device, and a memory control circuit unit.

Description of Related Art

The rapid growth of portable electronic devices such as mobile phones and laptops in recent years has led to a rapid increase in consumer demand for storage media. Since a rewritable non-volatile memory module (e.g. a flash memory) has the characteristics of data non-volatility, power saving, small size, and having no mechanical structure, it is very suitable for being built in a variety of portable electronic devices as exemplified above.

In order to improve the data access efficiency of a rewritable non-volatile memory module, some types of rewritable non-volatile memory modules may be configured with a buffer area and a storage area. When storing data from the host system, the data is first stored in a buffer area in the rewritable non-volatile memory module that has a faster access speed but a smaller data capacity. After the data in the buffer area has accumulated to a certain amount, the data in the buffer area may be moved (copied) to a storage area in the rewritable non-volatile memory module with a slower access speed but a larger data capacity for storage. Thereby, a balance may be achieved between increasing the data access speed of the rewritable non-volatile memory module and increasing the data capacity of the rewritable non-volatile memory module.

However, as the size of the rewritable non-volatile memory module becomes smaller and/or the hardware cost increases, the number of physical units belonging to the buffer area inevitably decreases. Therefore, how to effectively manage the decreasing number of physical units in the buffer area to maximize the performance in the data access operation executed by the host system is one of the subjects that those skilled in the art are devoted to research.

SUMMARY

A memory management method, a memory storage device, and a memory control circuit unit that may improve the usage efficiency of physical units in a rewritable non-volatile memory module are provided in the disclosure.

An exemplary embodiment of the disclosure provides a memory management method for a rewritable non-volatile memory module. The memory management method includes the following operation. A data merge operation is activated. Multiple first-type physical units and at least one second-type physical unit are selected from the rewritable non-volatile memory module to execute the data merge operation, in which a data capacity of each first-type physical unit is less than a data capacity of each second-type physical unit. The first-type physical units include a first physical unit in a stable state and a second physical unit not in a stable state. During a first execution period of the data merge operation, first data is copied from the first physical unit to the at least one second-type physical unit. During the first execution period, second data is stored from a host system to the second physical unit.

An exemplary embodiment of the disclosure further provides a memory storage device, which includes a connection interface unit, a rewritable non-volatile memory module, and a memory control circuit unit. The connection interface unit is configured to couple to a host system. The memory control circuit unit is coupled to the connection interface unit and the rewritable non-volatile memory module. The memory control circuit unit is configured to perform the following operation. A data merge operation is activated. Multiple first-type physical units and at least one second-type physical unit are selected from the rewritable non-volatile memory module to execute the data merge operation, in which a data capacity of each first-type physical unit is less than a data capacity of each second-type physical unit. The first-type physical units include a first physical unit in a stable state and a second physical unit not in a stable state. During a first execution period of the data merge operation, first data is instructed to copy from the first physical unit to the at least one second-type physical unit. During the first execution period, second data is instructed to be stored from the host system to the second physical unit.

An exemplary embodiment of the disclosure further provides a memory control circuit unit for controlling a rewritable non-volatile memory module. The memory control circuit unit includes a host interface, a memory interface, and a memory management circuit. The host interface is configured to couple to the host system. The memory interface is configured to couple to the rewritable non-volatile memory module. The memory management circuit is coupled to the host interface and the memory interface. The memory management circuit is configured to perform the following operation. A data merge operation is activated. Multiple first-type physical units and at least one second-type physical unit are selected from the rewritable non-volatile memory module to execute the data merge operation, in which a data capacity of each first-type physical unit is less than a data capacity of each second-type physical unit. The first-type physical units include a first physical unit in a stable state and a second physical unit not in a stable state. During a first execution period of the data merge operation, first data is instructed to copy from the first physical unit to the at least one second-type physical unit. During the first execution period, second data is instructed to be stored from the host system to the second physical unit.

Based on the above, after the data merge operation is activated, multiple first-type physical units and one second-type physical unit may be selected from the rewritable non-volatile memory module to execute the data merge operation. In particular, the data capacity of each first-type physical unit is less than the data capacity of each second-type physical unit. Thereafter, during a first execution period of the data merge operation, the first data may be moved (copied) from a first physical unit in a stable state among the first-type physical units to the second-type physical unit, and the second data from the host system may be stored in a second physical unit that is not in a stable state among the first-type physical units. Thereby, the usage efficiency of the first-type physical unit may be effectively improved.

DETAILED DESCRIPTION OF DISCLOSED EMBODIMENTS

In general, a memory storage device (also referred to as a memory storage system) includes a rewritable non-volatile memory module and a controller (also referred to as a control circuit). The memory storage device may be used with a host system so that the host system may write data to or read data from the memory storage device.

Figure 1:
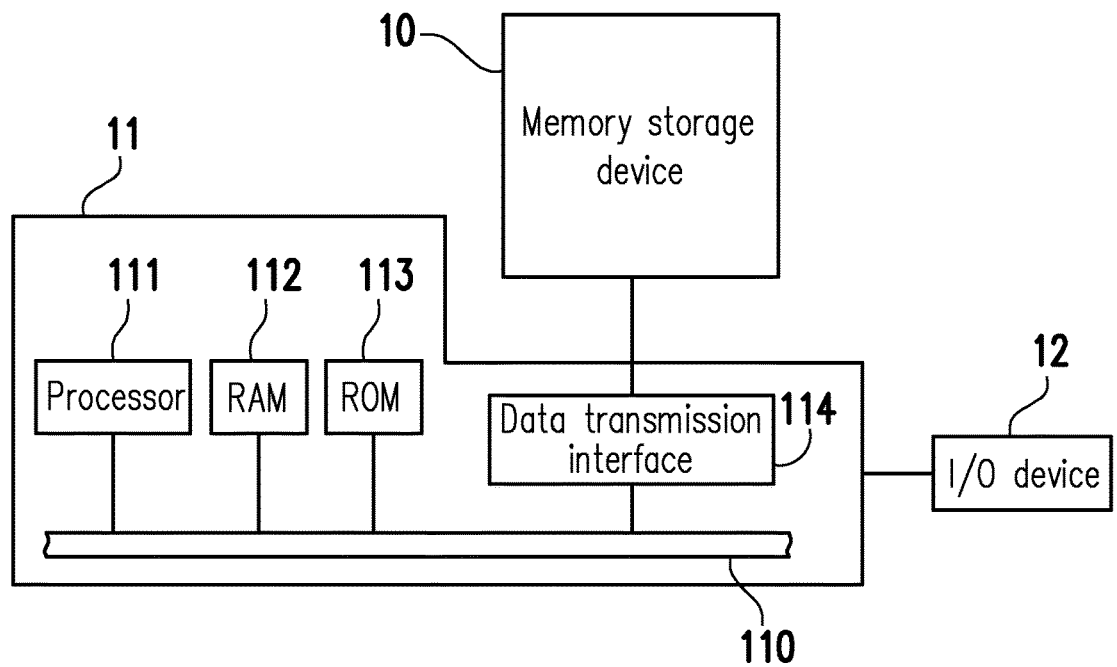
FIG. 1 is a schematic diagram of a host system, a memory storage device, and an input/output (I/O) device according to an exemplary embodiment of the disclosure.
Figure 2:
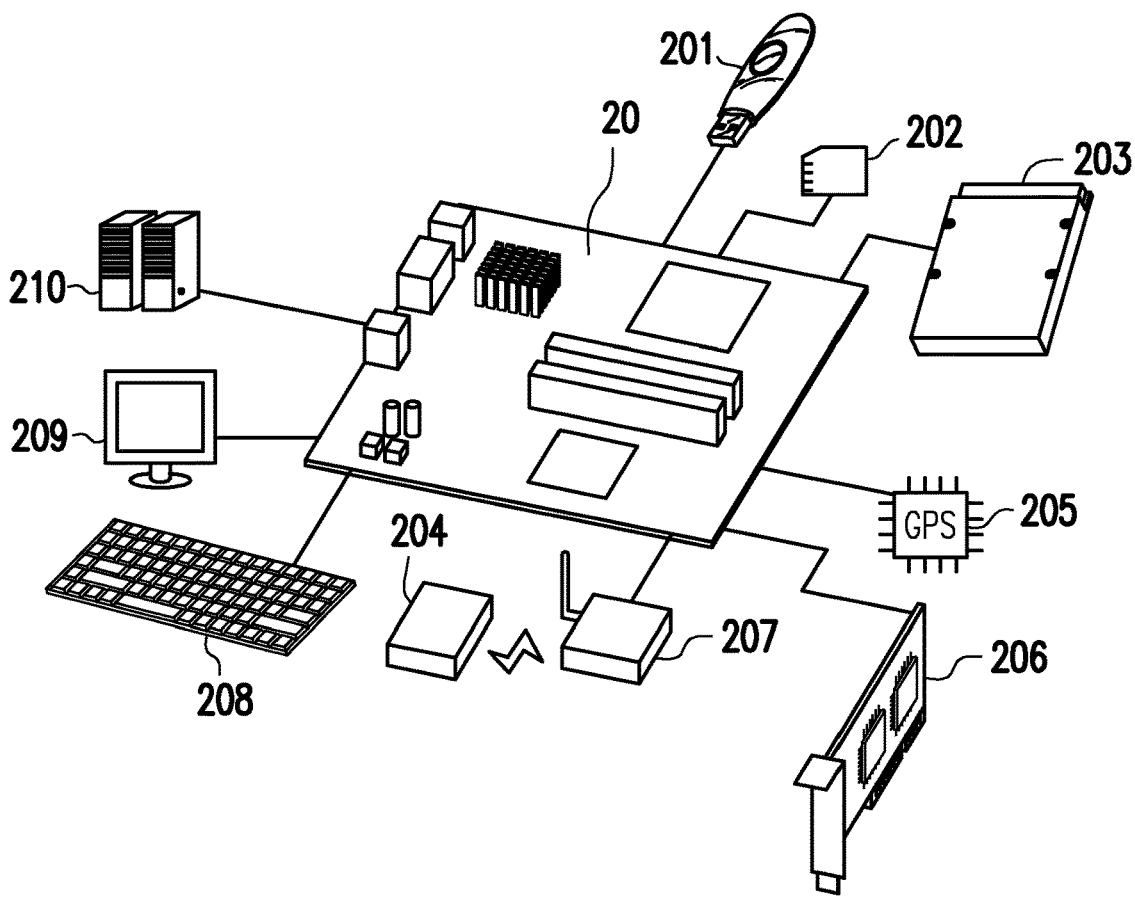
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Referring to FIG. 1 and FIG. 2, a host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transmission interface 114. For example, the host system 11 may store data to or read data from the memory storage device 10 via the data transmission interface 114. In addition, the host system 11 may be coupled to an I/O device 12 through the system bus 110. For example, the host system 11 may transmit output signals to or receive input signals from the I/O device 12 via the system bus 110.

In an exemplary embodiment, the processor 111, the random access memory 112, the read only memory 113, and the data transmission interface 114 may be disposed on a motherboard of the host system 11. The number of the data transmission interface 114 may be one or more. The motherboard 20 may be coupled to the memory storage device 10 through the data transmission interface 114 via a wired or wireless connection.

In an exemplary embodiment, the memory storage device 10 may be, for example, a flash drive 201, a memory card 202, a solid state drive (SSD) 203, or a wireless memory storage device 204. The wireless memory storage device 204 may be a memory storage device based on various wireless communication technologies, such as a near field communication (NFC) memory storage device, a wireless fax (WiFi) memory storage device, a Bluetooth memory storage device, a low power Bluetooth memory storage device (e.g. iBeacon), etc. In addition, the motherboard may also be coupled to various I/O devices, such as a global positioning system (GPS) module 205, a network interface card 206, a wireless transmission device 207, a keyboard 208, a screen 209, a speaker 210, etc., through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device and the host system 11 may respectively include the memory storage device 30 and the host system 31 of FIG. 3.

Figure 3:
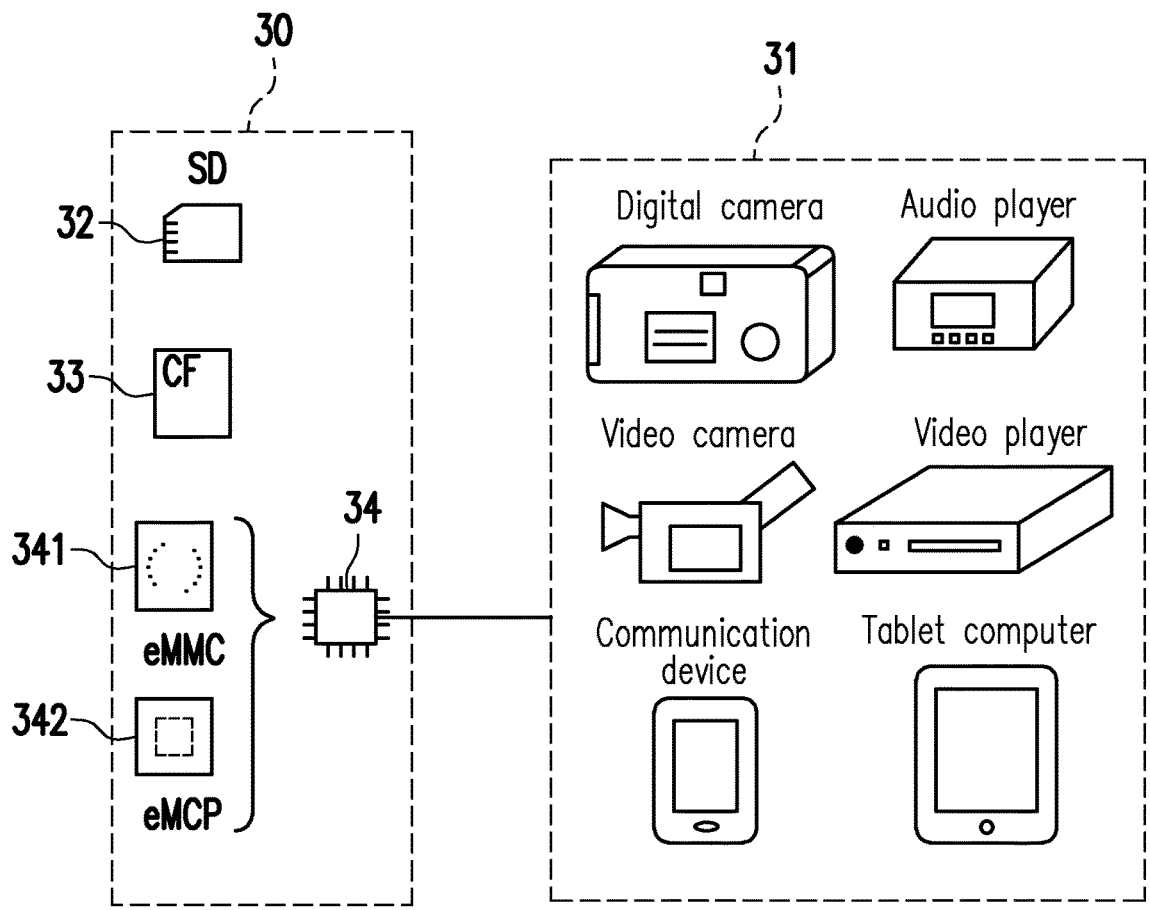
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Referring to FIG. 3, the memory storage device may be used in conjunction with the host system 31 to store data. For example, the host system 31 may be a system such a digital camera, a video camera, a communication device, an audio player, a video player, or a tablet, etc. For example, the memory storage device 30 may be various non-volatile memory storage devices, such as a secure digital (SD) card 32, a compact flash (CF) card 33, or an embedded storage device 34, etc., used in the host system 31. The embedded storage device 34 includes various embedded storage devices that directly couple a memory module to a substrate of the host system, such as an embedded multimedia card (eMMC) 341 and/or an embedded multi-chip package (eMCP) storage device 342, etc.

Figure 4:
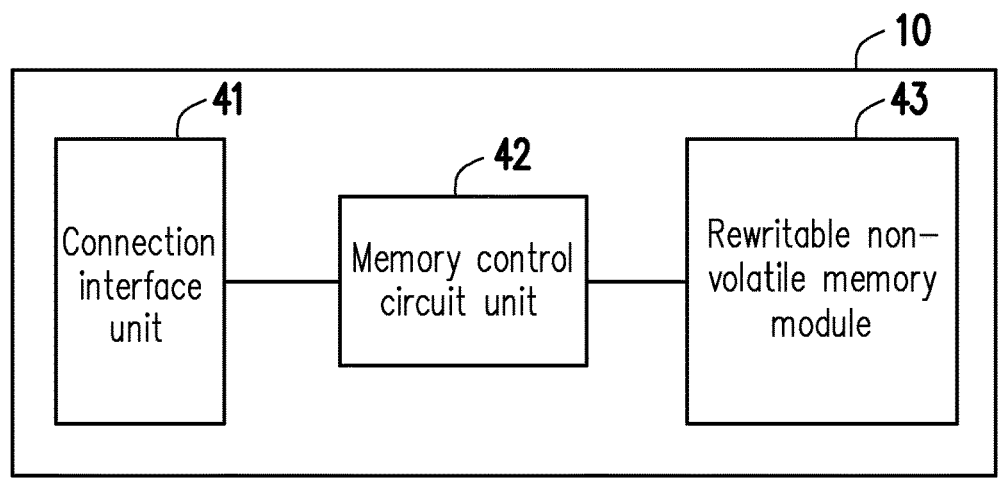
FIG. 4 is a schematic diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is used for coupling the memory storage device 10 to the host system 11. The memory storage device 10 may communicate with the host system 11 via the connection interface unit 41. In an exemplary embodiment, the connection interface unit 41 is compatible with the peripheral component interconnect express (PCI Express) standard. In an exemplary embodiment, the connection interface unit 41 may also be compliant to the serial advanced technology attachment (SATA) standard, the parallel advanced technology attachment (PATA) standard, the institute of electrical and electronics engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 may be packaged in a chip with the memory control circuit unit 42, or the connection interface unit 41 may be disposed outside a chip including the memory control circuit unit 42.

The memory control circuit unit 42 is coupled to the connection interface unit 41 and the rewritable non-volatile memory module 43. The memory control circuit unit 42 is used to execute multiple logic gates or control commands implemented in a hardware form or a firmware form and to perform operations such as writing, reading, and erasing of data in the rewritable non-volatile memory module 43 according to the commands of the host system 11.

The rewritable non-volatile memory module 43 is used to store the data written by the host system 11. The rewritable non-volatile memory module 43 may include a single level cell (SLC) NAND-type flash memory module (i.e., a flash memory that may store 1 bit in one memory cell), multi-level cell (MLC) NAND-type flash memory module (i.e., a flash memory module that may store 2 bits in one memory cell), a triple level cell (TLC) NAND-type flash memory module (i.e., a flash memory module that may store 3 bits in one memory cell), a quad level cell (QLC) NAND-type flash memory module (i.e., a flash memory module that may store 4 bits in one memory cell), other flash memory modules, or other memory modules with the same characteristics.

Each memory cell in the rewritable non-volatile memory module 43 stores one or more bits by a change in a voltage (also referred to as a threshold voltage hereinafter). Specifically, there is a charge trapping layer between a control gate and a channel of each of the memory cells. By applying a write voltage to the control gate, the amount of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each of the memory cells in the rewritable non-volatile memory module 43 has multiple storage statuses. By applying a read voltage, it is possible to determine which storage status a memory cell belongs to, thereby obtaining the one or more bits stored in the memory cell.

In an exemplary embodiment, the memory cells of the rewritable non-volatile memory module 43 may constitute multiple physical programming units, and the physical programming units may constitute multiple physical erasing units. Specifically, memory cells on the same word line may form one or more physical programming units. If each memory cell may store two or more bits, the physical programming units on the same word line may be classified at least as lower physical programming units and upper physical programming units. For example, the least significant bit (LSB) of a memory cell belongs to a lower physical programming unit, and the most significant bit (MSB) of a memory cell belongs to an upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In the present exemplary embodiment, the physical programming unit is the minimum unit for programming. That is, the physical programming unit is the minimum unit for write data. For example, the physical programming unit may be a physical page or a physical sector. If the physical programming unit is a physical page, then the physical programming unit may include a data bit area and a redundancy bit area. The data bit area includes multiple physical sectors is used for storing user data, and the redundancy bit area is used for storing system data (e.g., management data such as error correction codes). In an exemplary embodiment, the data bit area includes 32 physical sectors, and the size of a physical sector is 512 bytes (B). However, in other exemplary embodiments, the data bit area may also include 8, 16, or a greater or lesser number of physical sectors, and the size of each of the physical sectors may also be larger or smaller. On the other hand, the physical erasing unit is the minimum unit for erasing. That is, each of the physical erasing units includes the smallest number of memory cells to be erased together. For example, the physical erasing unit is a physical block.

Figure 5:
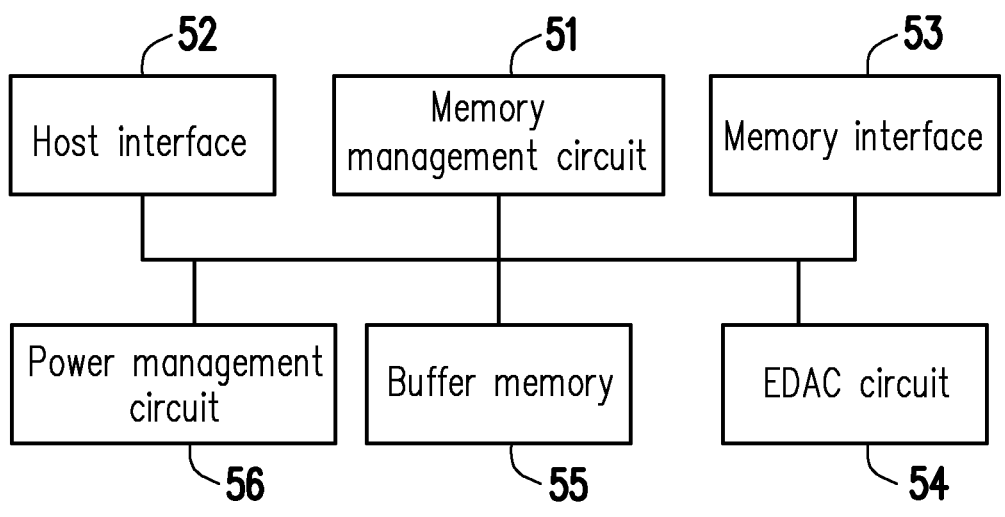
FIG. 5 is a schematic diagram of a memory control circuit unit according to an exemplary embodiment of the disclosure.

FIG. 5 is a schematic diagram of a memory control circuit unit according to an exemplary embodiment of the disclosure. Referring to FIG. 5, the memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 operates, the control commands are executed to perform operations such as writing, reading, and erasing data. The following description of the operation of the memory management circuit 51 is equivalent to the description of the operation of the memory control circuit unit 42.

In an exemplary embodiment, the control commands of the memory management circuit 51 are implemented in a firmware form. For example, the memory management circuit 51 has a microprocessor unit (not shown) and a read only memory (not shown), and the control commands are programmed into the read only memory. When the memory storage device 10 operates, the control commands are executed by the microprocessor unit to perform operations such as writing, reading, and erasing data.

In an exemplary embodiment, the control commands of the memory management circuit 51 may also be stored in a specific area of the rewritable non-volatile memory module 43 (for example, a system area dedicated to storing system data in the memory module) in a program code form. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. Thereafter, the microprocessor unit runs these control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is used to manage the memory cells or a memory cell group of the rewritable non-volatile memory module 43. The memory writing circuit is used to issue a write command sequence to the rewritable non-volatile memory module 43 to write data into the rewritable non-volatile memory module 43. The memory reading circuit is used to issue a read command sequence to the rewritable non-volatile memory module 43 to read data from the rewritable non-volatile memory module 43. The memory erasing circuit is used to issue an erase command sequence to the rewritable non-volatile memory module 43 to erase data from the rewritable non-volatile memory module 43. The data processing circuit is used to process the data to be written into the rewritable non-volatile memory module 43 and the data read from the rewritable non-volatile memory module 43. The write command sequence, the read command sequence and the erase command sequence may respectively include one or more program codes or command codes for instructing the rewritable non-volatile memory module 43 to execute corresponding writing, reading, and erasing operations. In an exemplary embodiment, the memory management circuit 51 may also issue other types of command sequences to the rewritable non-volatile memory module 43 to instruct the rewritable non-volatile memory module 43 to execute corresponding operations.

The host interface 52 is coupled to the memory management circuit 51. The memory management circuit 51 may communicate with the host system 11 through the host interface 52. The host interface 52 may be used to receive and identify the commands and data transmitted by the host system 11. For example, the commands and data transmitted by the host system 11 may be transmitted to the memory management circuit 51 through the host interface 52. In addition, the memory management circuit 51 may transmit data to the host system 11 through the host interface 52. In this exemplary embodiment, the host interface 52 is compatible with the PCI Express standard. However, it should be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable to the rewritable non-volatile memory module 43 via the memory interface 53. Specifically, if the memory management circuit 51 is to access the rewritable non-volatile memory module 43, the memory interface 53 transmits a corresponding command sequence. For example, the command sequences may include a write command sequence to instruct data writing, a read command sequence to instruct data reading, an erase command sequence to instruct data erasing, and corresponding command sequences for instructing various memory operations (e.g., changing the read voltage level, etc.). These command sequences are, for example, generated by the memory management circuit 51 and transmitted to the rewritable non-volatile memory module 43 via the memory interface 53. These command sequences may include one or more signals or data on the bus. The signals or data may include command codes or program codes. For example, the read command sequence includes information such as the read identification code, the memory address, etc.

In an exemplary embodiment, the memory control circuit unit 42 further includes an error detecting and correcting (EDAC) circuit 54, a buffer memory 55, and a power management circuit 56.

The error detecting and correcting circuit 54 is coupled to the memory management circuit 51 and is configured to execute an error detecting and correcting operation to ensure the correctness of the data. Specifically, when the memory management circuit 51 receives a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code to the rewritable non-volatile memory module 43. Thereafter, when the memory management circuit 51 reads data from the rewritable non-volatile memory module 43, it simultaneously reads the error correcting code and/or the error detecting code corresponding to the data, and the error detecting and correcting circuit 54 executes the error detecting and correcting operation on the read data according to the error correcting code and/or error detecting code. For example, the error detecting and correcting circuit 54 may support various encoding/decoding algorithms such as low density parity check code (LDPC code) or BCH, etc.

The buffer memory 55 is coupled to the memory management circuit 51 and used to temporarily store data. The power management circuit 56 is coupled to the memory management circuit 51 and used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
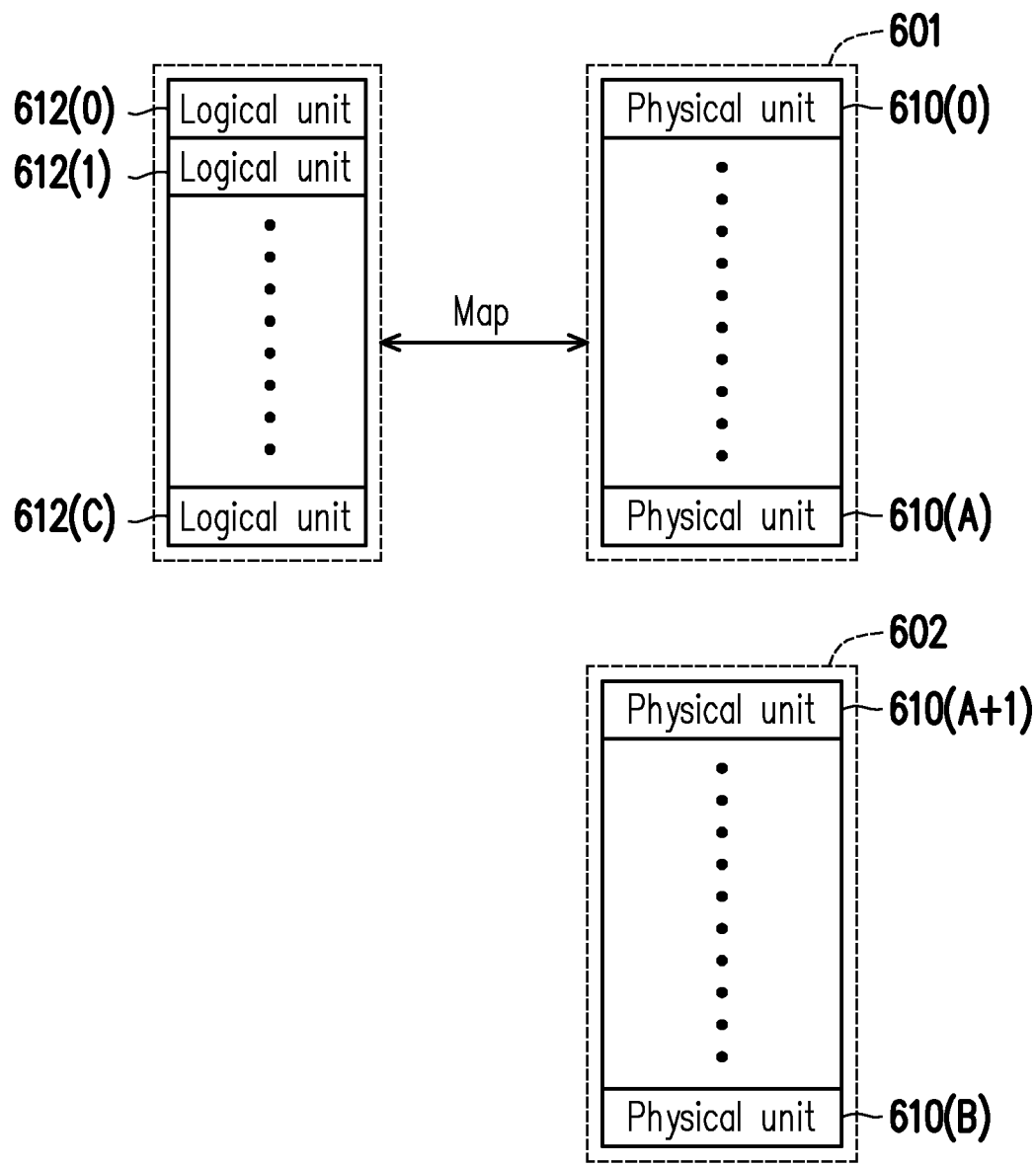
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 51 may logically group the physical units 610(0) to 610(B) in the rewritable non-volatile memory module 43 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if the data read from a certain physical unit includes too many errors to be corrected, the physical unit is regarded as a damaged physical unit. It should be noted that if there is no available physical unit in the replacement area 602, the memory management circuit 51 may declare the entire memory storage device 10 as a write-protected state, and data cannot be written anymore.

In an exemplary embodiment, a physical unit refers to a physical address or a physical programming unit. In an exemplary embodiment, a physical unit may also be formed by multiple consecutive or non-consecutive physical addresses. In an exemplary embodiment, a physical unit may also refer to a virtual block (VB). A virtual block may include multiple physical addresses or multiple physical programming units.

The logic units 612(0) to 612(C) may be configured in the memory management circuit 51 to map the physical units 610(0) to 610(A). In an exemplary embodiment, each of the logic units corresponds to a logical address. For example, a logical address may include one or more logical block addresses (LBA) or other logical management units. In an exemplary embodiment, a logic unit may also correspond to a logical programming unit or be formed by multiple consecutive or non-consecutive logical addresses.

It should be noted that a logic unit may be mapped to one or more physical units. If a certain physical unit is currently mapped by a certain logic unit, it means that the data currently stored in this physical unit includes valid data. On the contrary, if a certain physical unit is not currently mapped by any logic unit, it means that the data currently stored in this physical unit is invalid data.

In an exemplary embodiment, a physical unit that is not mapped by a logic unit, a physical unit that does not store valid data, and/or a physical unit that has been erased is also referred to as a spare physical unit. When new data is to be stored, the memory management circuit 51 may instruct the rewritable non-volatile memory module 43 to store the data into a certain spare physical unit. In addition, the memory management circuit 51 may execute a data merge operation to release new spare physical units. For example, the data merge operation may include a garbage collection (GC) operation. By executing the data merge operation, the total number of spare physical units may be increased and/or maintained at no less than a specified number.

In an exemplary embodiment, the physical units 610(0) to 610(B) in the rewritable non-volatile memory module 43 may include a first-type physical unit and a second-type physical unit. For example, each physical unit in the rewritable non-volatile memory module 43 may be one of the first-type physical unit and the second-type physical unit. For example, in the rewritable non-volatile memory module 43, the total number of the first-type physical units is less than the total number of the second-type physical units, the data access speed of each first-type physical unit is greater than the data access speed of each second-type physical unit, and/or the data capacity of each first-type physical unit is less than the data capacity of each second-type physical unit.

In an exemplary embodiment, the first-type physical unit may be regarded as a temporary storage area or a buffer area for data, and the second-type physical unit may be regarded as a storage area for data. In an exemplary embodiment, data from the host system 11 may be quickly stored in the first-type physical unit through higher writing efficiency. In response to data from the host system 11 being stored in the first-type physical unit, a write complete message may be sent back to the host system 11. Afterwards, the data stored in the first-type physical unit may be moved (copied) to the second-type physical unit with larger data capacity for storage in a background operation. Then, the used first-type physical unit may be released and erased to continuously receive (i.e., store) new data from the host system 11.

In an exemplary embodiment, the memory management circuit 51 may instruct the rewritable non-volatile memory module 43 to program the first-type physical unit based on a certain programming mode (also referred to as the first programming mode), to store data in the first-type physical unit. On the other hand, the memory management circuit 51 may instruct the rewritable non-volatile memory module 43 to program the second-type physical unit based on another programming mode (also referred to as the second programming mode), to store data in the second-type physical unit. The first programming mode is different from the second programming mode.

In an exemplary embodiment, the first programming mode is configured to store P bits in a single memory cell in the first-type physical unit, and the second programming mode is configured to store Q bits in a single memory cell in the second-type physical unit. Both P and Q are positive integers, and P is not equal to Q.

In an exemplary embodiment, P is less than Q. For example, P may be "1" and Q may be "2", "3", or "4". In an exemplary embodiment, when the number of memory cells is the same, the data capacity of each first-type physical unit may be P/Q of the data capacity of each second-type physical unit. For example, assuming that P and Q are "1" and "4" respectively, the data capacity of each first-type physical unit may be ¼ of the data capacity of each second-type physical unit.

In an exemplary embodiment, the first programming mode refers to one of the SLC programming mode, the pseudo SLC programming mode, the lower physical programming mode, the mixture programming mode, and the less layer memory cell mode. In the SLC programming mode and the pseudo SLC programming mode, a memory cell only stores one bit of data. In the lower physical programming mode, only the lower physical programming unit is programmed, and the upper physical programming unit corresponding to the lower physical programming unit may not be programmed. In the mixture programming mode, valid data (or real data) is programmed in the lower physical programming unit, and at the same time dummy data is programmed to the upper physical programming unit corresponding to the lower physical programming unit that stores the valid data. In the less layer memory cell mode, a memory cell stores data of a first number of bits. For example, the first number may be set to "1". In an exemplary embodiment, the second programming mode refers to an MLC programming mode, a TLC programming mode, a QLC programming mode, or the like. In the second programming mode, a memory cell may store data of a second number of bits, in which the second number is equal to or greater than "2". For example, the second number may be set to "2", "3", or "4". In another exemplary embodiment, both the first number in the first programming mode and the second number in the second programming mode may be other numbers, as long as the second number is greater than the first number.

In an exemplary embodiment, the memory management circuit 51 may activate a data merge operation. After activating the data merge operation, during the execution period of the data merge operation, one or more spare physical units belonging to the second-type physical units are configured to store data (i.e., new data) from the host system 11, one or more new spare physical units belonging to the first-type physical units may be correspondingly released. In this way, it may ensure that more data from the host system 11 may be continuously stored in the first-type physical units, and/or avoid the situation that the spare physical units belonging to the first-type physical units are insufficient.

In an exemplary embodiment, in response to activating the data merge operation, the memory management circuit 51 may select multiple first-type physical units and at least one second-type physical unit from the rewritable non-volatile memory module 43 to execute the data merge operation. The selected first-type physical units may be regarded as source units of the valid data collected in the data merge operation. The selected second-type physical unit may be regarded as a target unit configured to store valid data collected in the data merge operation. In particular, the selected first-type physical units include at least one physical unit in a stable state and at least one physical unit not in a stable state (i.e., non-stable).

In an exemplary embodiment, a physical unit in a stable state refers to a physical unit that has been filled (with data), and a physical unit that is not in a stable state refers to a physical unit that has not been filled (with data) (including physical units that have not been written with any data). For example, assuming that a certain physical unit has not been configured to store data, it means that the physical unit currently is not in a stable state. The physical unit is still not in a stable state while data is being stored to this physical unit. After the physical unit is full, the physical unit may automatically transition to be in a stable state in response to the physical unit being filled.

In an exemplary embodiment, the total amount of valid data stored in the first-type physical units selected in response to activating the data merge operation is less than the data capacity of a single second-type physical unit. For example, at a certain time point, the total amount of valid data stored in multiple first-type physical units selected as source units may only be ⅓ or ¼, etc., of the data capacity of a single second-type physical unit selected as the target unit.

In an exemplary embodiment, after activating the data merge operation, during the execution period of the data merge operation (also referred to as the first execution period), the memory management circuit 51 may instruct the rewritable non-volatile memory module 43 to copy data (also referred to as the first data) from at least one physical unit (also referred to as the first physical unit) in a stable state among the selected first-type physical units (i.e., the source units) to a second-type physical unit serving as the target unit. For example, the first data may include valid data stored in the first physical unit. On the other hand, during the first execution period, the memory management circuit 51 may simultaneously instruct the rewritable non-volatile memory module 43 to store new data (also referred to as the second data) from the host system 11 into at least one physical unit (also referred to as the second physical unit) that is not in the stable state among the selected first-type physical units (i.e., the source units).

In an exemplary embodiment, after the second data is stored into the second physical unit, the second physical unit may be transformed to be in a stable state. For example, in response to the second physical unit being filled with the second data, the second physical unit that was not in the stable state may be automatically converted to be in the stable state.

In an exemplary embodiment, after the second data is stored in the second physical unit, during another execution period (also referred to as the second execution period) of the data merge operation, the memory management circuit 51 may instruct the rewritable non-volatile memory module 43 to copy the data (i.e., the second data) from the second physical unit in the stable state to the second-type physical unit serving as the target unit. On the other hand, during the second execution period, the memory management circuit 51 may also instruct the rewritable non-volatile memory module 43 to store new data (also referred to as the third data) from the host system 11 into another physical unit (also referred to as the third physical unit) that is not in the stable state among the selected first-type physical units (i.e., the source units).

By analogy, during the execution period of the data merge operation, the first-type physical units selected as source units may be sequentially configured to store data from the host system 11 according to a preset sequence. At the same time, during the execution of the data merge operation, the data stored in the source unit (i.e., valid data) may be sequentially copied from multiple first-type physical units serving as source units to the second-type physical unit serving as the target unit according to the preset sequence.

In an exemplary embodiment, after at least one second-type physical unit serving as the target unit is full, the memory management circuit 51 may synchronously release multiple physical units among the first-type physical units serving as source units whose stored valid data has been completely copied to the target unit as spare physical units. By confirming that the second-type physical unit serving as the target unit is in a stable state, then synchronously releasing the physical units among the source units whose stored valid data has been copied to the target unit as spare physical units, it may ensure that the collected valid data have all been correctly written to the target unit.

In an exemplary embodiment, after copying the first data from the first physical unit among the first-type physical units to the second-type physical unit serving as the target unit, the memory management circuit 51 may correspondingly release the first physical unit as a spare physical unit. Similarly, after copying the second data from the second physical unit among the first-type physical units to the second-type physical unit serving as the target unit, the memory management circuit 51 may correspondingly release the second physical unit as a spare physical unit. In an exemplary embodiment, by releasing, one by one, the physical units among the source units whose valid data has been copied, the speed of providing new spare physical units may be accelerated.

FIG. 7A to FIG. 7F are schematic diagrams of synchronous execution of a host system write operation and a data merge operation according to an exemplary embodiment of the disclosure. It should be noted that, in the exemplary embodiment of FIG. 7A to FIG. 7F, the data capacity of each first-type physical unit being ¼ of the data capacity of each second-type physical unit is taken as an example, but the disclosure is not limited thereto.

Figure 7A:
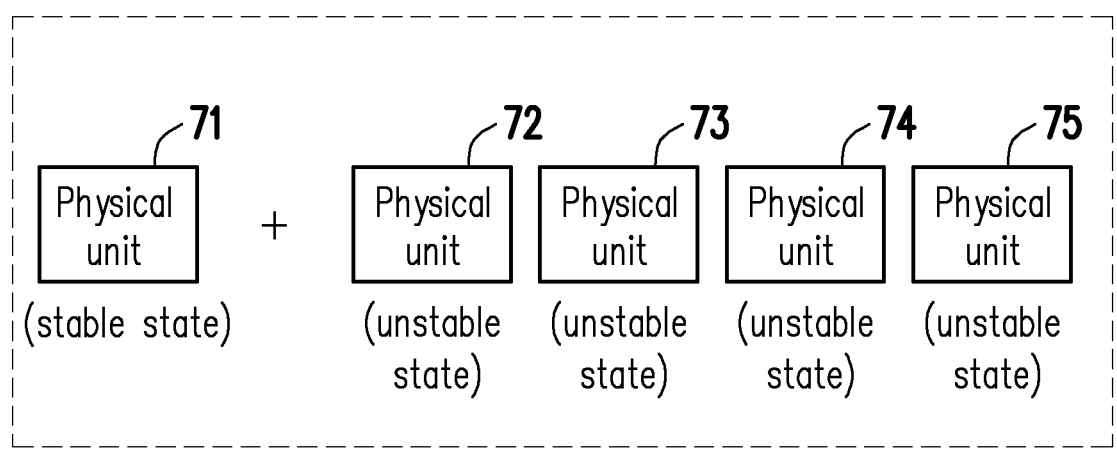
FIG. 7A to FIG. 7F are schematic diagrams of synchronous execution of a host system write operation and a data merge operation according to an exemplary embodiment of the disclosure.

Referring to FIG. 7A, the memory management circuit 51 may select the physical units 71 to 75 as source units in the data merge operation. The physical units 71 to 75 all belong to the first-type physical unit. It should be noted that among the selected source units, the physical unit 71 is in a stable state, while none of the physical units 72 to 75 are in a stable state.

Figure 7B:
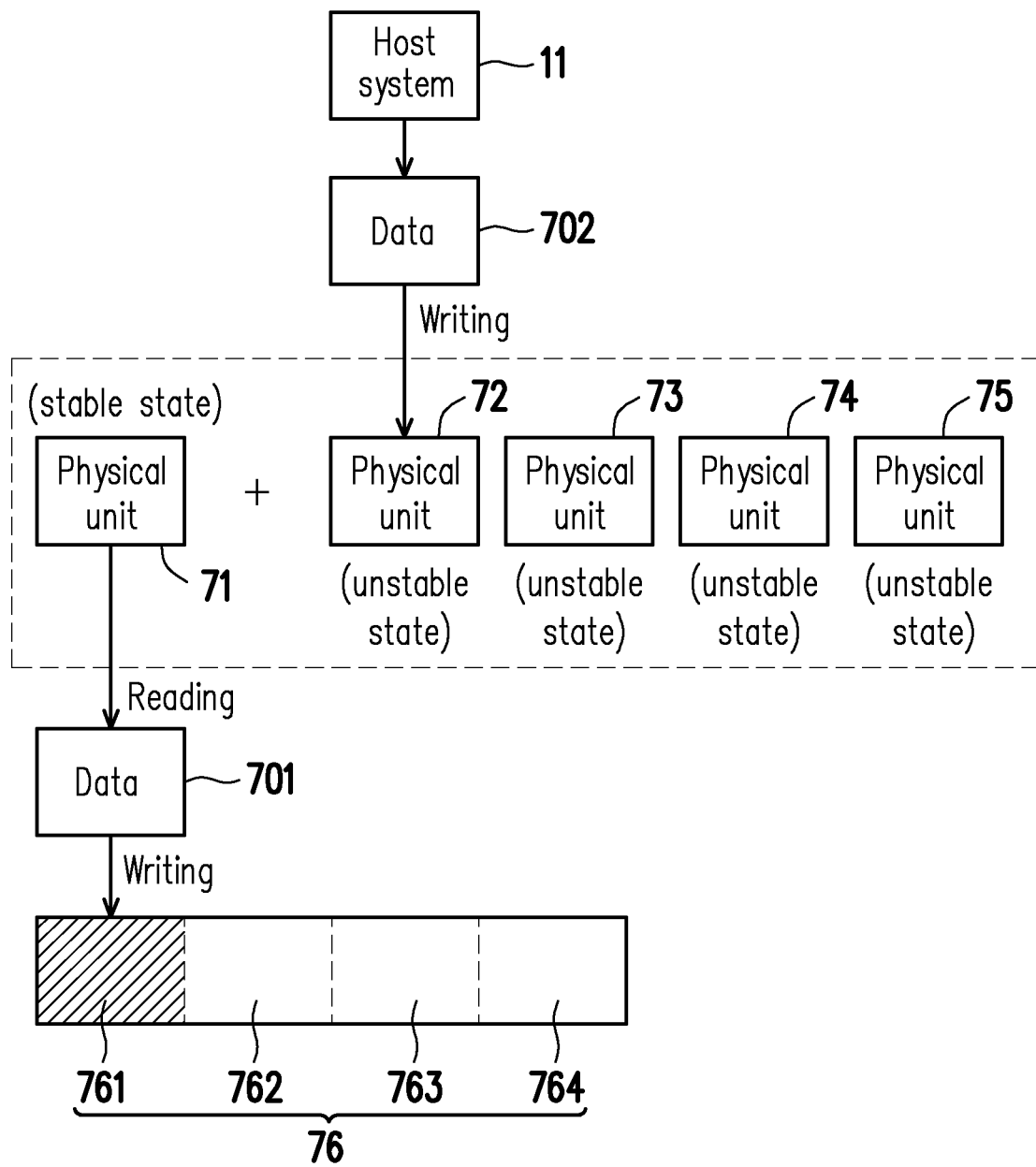

Referring to FIG. 7B, the memory management circuit 51 may select the physical unit 76 as the target unit in the data merge operation. The physical unit 76 belongs to the second-type physical unit. After selecting the source unit (i.e., the physical units 71 to 75) and the target unit (i.e., the physical unit 76), during an execution period of the data merge operation, the memory management circuit 51 may instruct the rewritable non-volatile memory module 43 to read the data 701 from the physical unit 71 in a stable state among the source units and write the read data 701 to the physical unit 76 (i.e., the data 701 is copied from the physical unit 71 to the physical unit 76). For example, the data 701 may be stored in the data area 761 in the physical unit 76, and the data 701 includes valid data.

On the other hand, during the period of copying the data 701 from the physical unit 71 to the physical unit 76, the memory management circuit 51 may instruct the rewritable non-volatile memory module 43 to synchronously write the data 702 from the host system 11 to the physical unit 72 that is not in the stable state among the source units. For example, the memory management circuit 51 may receive a write command instructing to store the data 702 from the host system 11. The memory management circuit 51 may instruct the rewritable non-volatile memory module 43 to write the data 702 into the physical unit 72 according to the write command.

It should be noted that after the data 702 is written into the physical unit 72, the filled physical unit 72 may be converted to a stable state. In addition, the memory management circuit 51 may control the time point when the data area 761 is full to be the same as or very close to the time point when the physical unit 72 is full. Thereby, in response to the physical unit 72 being full, the valid data of the physical unit 71 is also completely copied to the physical unit 76.

Figure 7C:
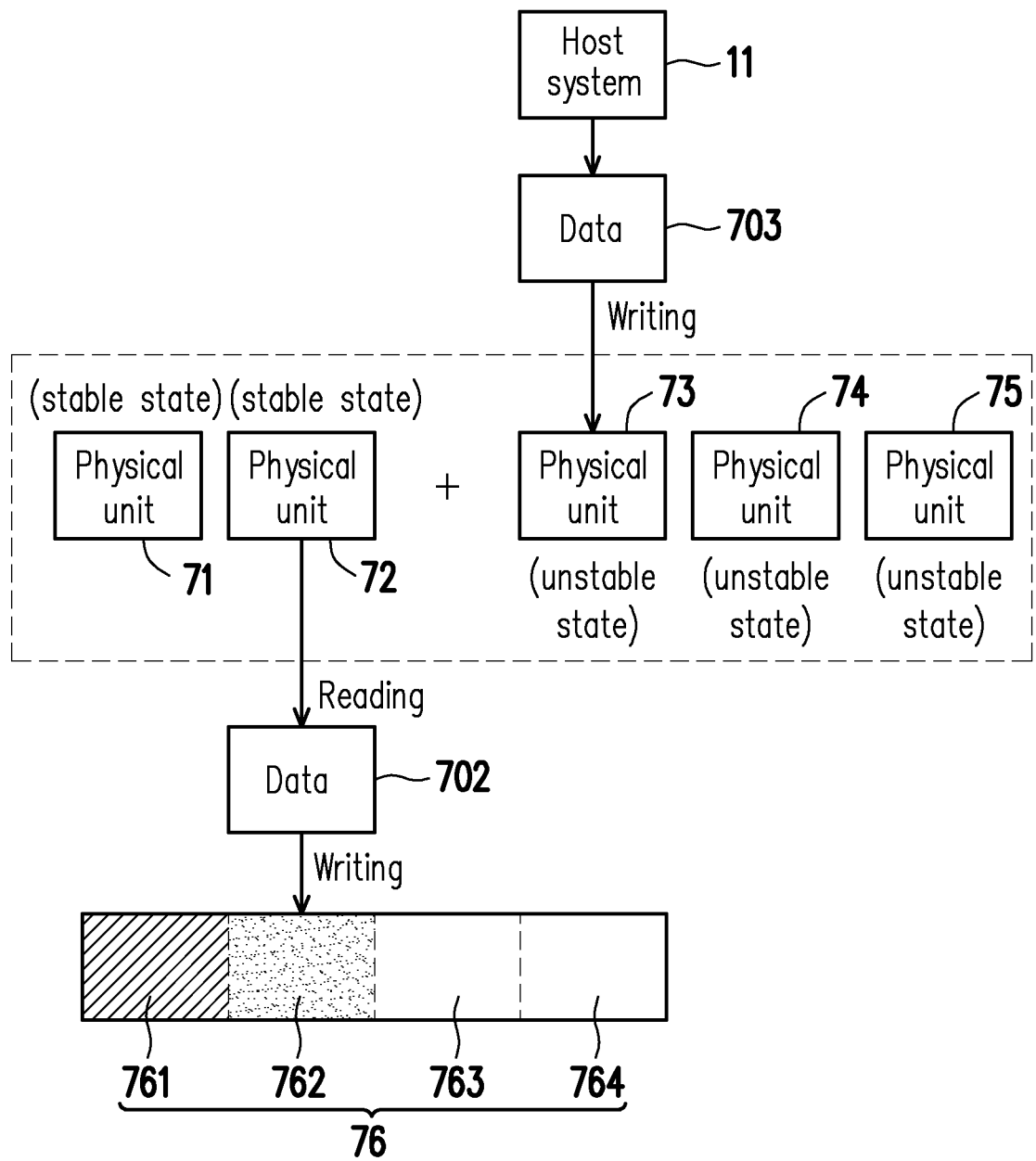

Referring to FIG. 7C, following the exemplary embodiment of FIG. 7B, after the physical unit 72 is in a stable state, during the next execution period of the data merge operation, the memory management circuit 51 may instruct the rewritable non-volatile memory module 43 to read the data 702 from the physical unit 72 in a stable state among the source units and write the read data 702 to the physical unit 76 (i.e., copying the data 702 from the physical unit 72 to the physical unit 76). For example, the data 702 may be stored in the data area 762 in the physical unit 76, and the data 702 includes valid data.

On the other hand, during the period of copying the data 702 from the physical unit 72 to the physical unit 76, the memory management circuit 51 may instruct the rewritable non-volatile memory module 43 to synchronously write the data 703 from the host system 11 to the physical unit 73 that is not in the stable state among the source units. For example, the memory management circuit 51 may receive a write command instructing to store the data 703 from the host system 11. The memory management circuit 51 may instruct the rewritable non-volatile memory module 43 to write the data 703 into the physical unit 73 according to the write command.

It should be noted that after the data 703 is written into the physical unit 73, the filled physical unit 73 may be converted to a stable state. In addition, the memory management circuit 51 may control the time point when the data area 762 is full to be the same as or very close to the time point when the physical unit 73 is full. Thereby, in response to the physical unit 73 being full, the valid data of the physical unit 72 is also completely copied to the physical unit 76.

Figure 7D:
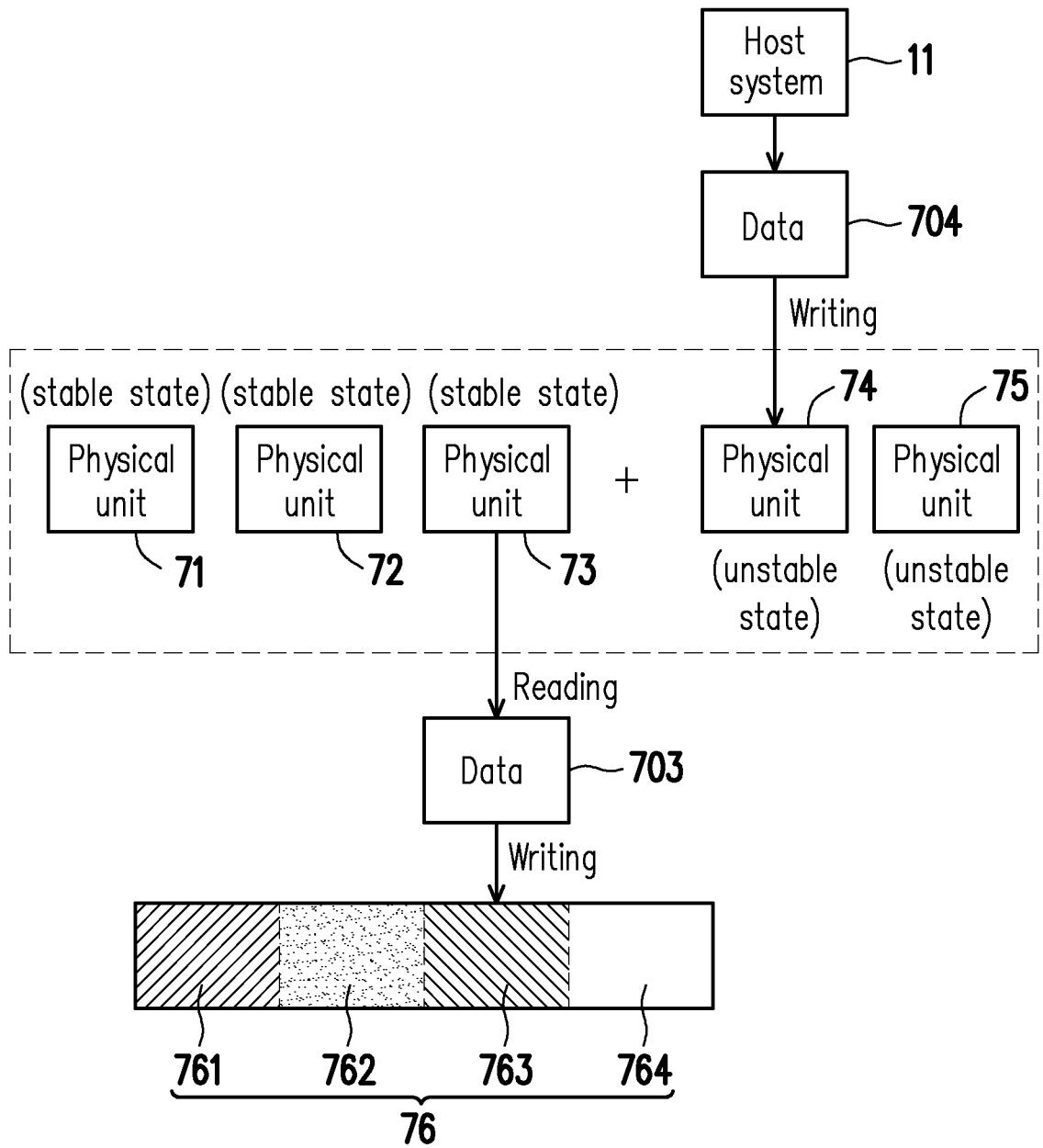

Referring to FIG. 7D, following the exemplary embodiment of FIG. 7C, after the physical unit 73 is in a stable state, during the next execution period of the data merge operation, the memory management circuit 51 may instruct the rewritable non-volatile memory module 43 to read the data 703 from the physical unit 73 in a stable state among the source units and write the read data 703 to the physical unit 76 (i.e., copying the data 703 from the physical unit 73 to the physical unit 76). For example, the data 703 may be stored in the data area 763 in the physical unit 76, and the data 703 includes valid data.

On the other hand, during the period of copying the data 703 from the physical unit 73 to the physical unit 76, the memory management circuit 51 may instruct the rewritable non-volatile memory module 43 to synchronously write the data 704 from the host system 11 to the physical unit 74 that is not in the stable state among the source units. For example, the memory management circuit 51 may receive a write command instructing to store the data 704 from the host system 11. The memory management circuit 51 may instruct the rewritable non-volatile memory module 43 to write the data 704 into the physical unit 74 according to the write command.

It should be noted that after the data 704 is written into the physical unit 74, the filled physical unit 74 may be converted to a stable state. In addition, the memory management circuit 51 may control the time point when the data area 763 is full to be the same as or very close to the time point when the physical unit 74 is full. Thereby, in response to the physical unit 74 being full, the valid data of the physical unit 73 is also completely copied to the physical unit 76.

Figure 7E:
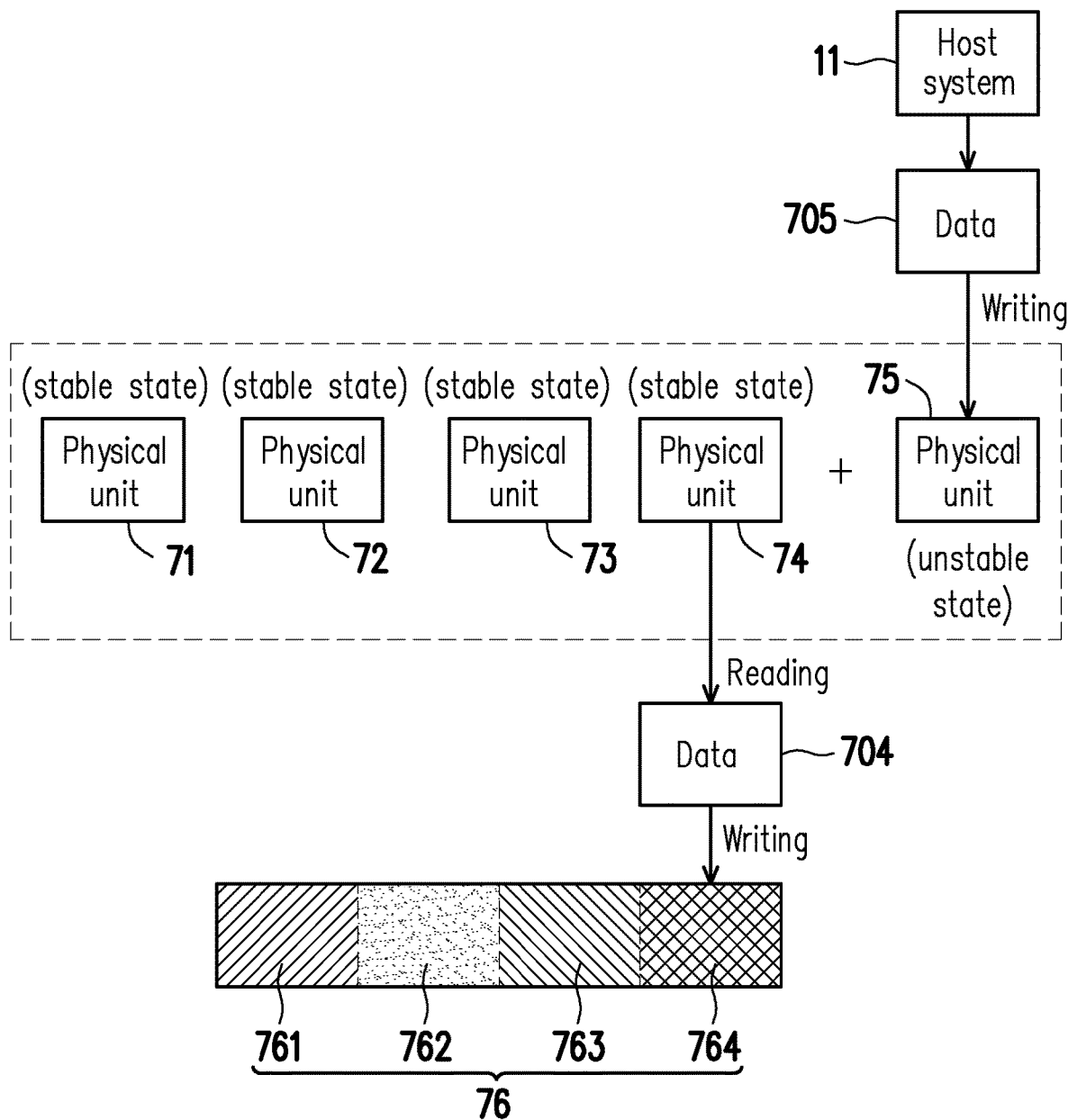

Referring to FIG. 7E, following the exemplary embodiment of FIG. 7C, after the physical unit 74 is in a stable state, during the next execution period of the data merge operation, the memory management circuit 51 may instruct the rewritable non-volatile memory module 43 to read the data 704 from the physical unit 74 in a stable state among the source units and write the read data 704 to the physical unit 76 (i.e., copying the data 704 from the physical unit 74 to the physical unit 76). For example, the data 704 may be stored in the data area 764 in the physical unit 76, and the data 704 includes valid data.

On the other hand, during the period of copying the data 704 from the physical unit 74 to the physical unit 76, the memory management circuit 51 may instruct the rewritable non-volatile memory module 43 to synchronously write the data 705 from the host system 11 to the physical unit 75 that is not in the stable state among the source units. For example, the memory management circuit 51 may receive a write command instructing to store the data 705 from the host system 11. The memory management circuit 51 may instruct the rewritable non-volatile memory module 43 to write the data 705 into the physical unit 75 according to the write command.

It should be noted that after the data 705 is written into the physical unit 75, the filled physical unit 75 may be converted to a stable state. In addition, the memory management circuit 51 may control the time point when the data area 764 is full to be the same as or very close to the time point when the physical unit 75 is full. Thereby, in response to the physical unit 75 being full, the valid data of the physical unit 74 is also completely copied to the physical unit 76. In addition, in the exemplary embodiment of FIG. 7E, the physical unit 76 serving as the target unit may be filled with the data 701 to 704 respectively collected from the physical units 71 to 74. Therefore, the filled physical unit 76 may be in a stable state.

Figure 7F:
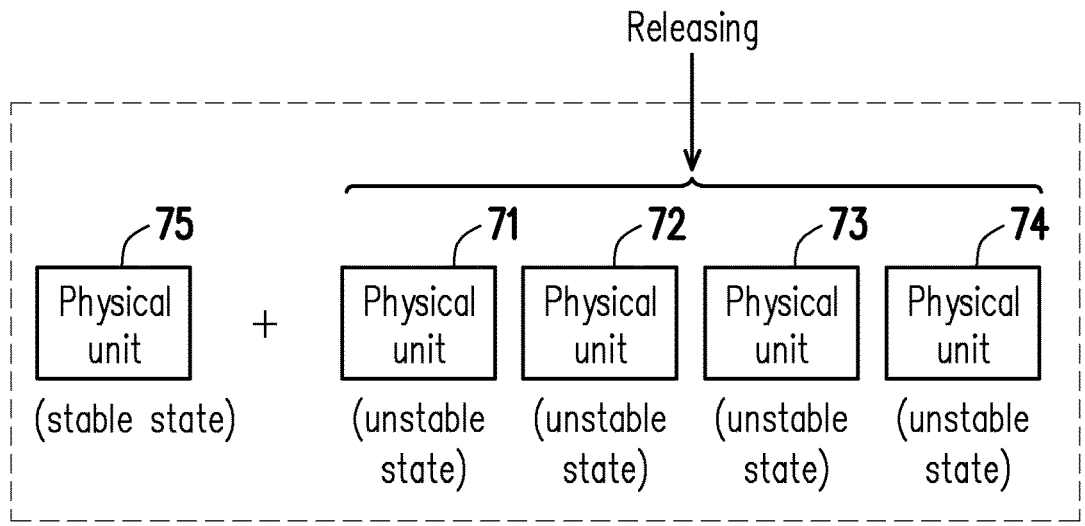

Referring to FIG. 7F, following the exemplary embodiment of FIG. 7E, in response to the physical unit 76 being in a stable state, the memory management circuit 51 may synchronously release the physical units 71 to 74 whose valid data has been completely copied among the source units as new spare physical units. For example, in response to the physical unit 76 being in a stable state, the memory management circuit 51 may update the logical and physical mapping information related to the data 701 to 704. The updated logical and physical mapping information may reflect that the data 701 to 704 stored in the physical unit 76 are valid data, while the data still stored in the physical units 71 to 74 are invalid data. Afterwards, the physical units 71 to 74 may be erased. The erased physical units 71 to 74 are not in a stable state.

In an exemplary embodiment, after the physical units 71 to 74 are released, the data merge operation using the physical units 71 to 75 as source units may continue to be executed synchronously with the host system write operation. For details of related operations, refer to the exemplary embodiments in FIG. 7A to FIG. 7E, and details are not repeated herein. It should be noted that, in the repeated execution of the data merge operation and the host system write operation, the usage sequence of the physical units 71 to 75 is fixed, for example, data is written from the host system 11 to the physical units 71 to 75 one by one and valid data is collected from the physical units 71 to 75 one by one (as shown in the exemplary embodiments of FIG. 7A to FIG. 7E). In this way, the smooth execution of the data merge operation and the host system write operation may be maintained.

It should be noted that, in an exemplary embodiment, the physical units 71 to 74 whose valid data has been completely copied may also be released as spare physical units one by one, instead of being released synchronously when the physical unit 76 is full. For example, in an exemplary embodiment of FIG. 7B, in response to the data 701 being stored in the physical unit 76, the physical unit 71 may be immediately released as a new spare physical unit. Meanwhile, in response to the data 701 being stored in the physical unit 76, the memory management circuit 51 may update the logical and physical mapping information related to the data 701. The updated logical and physical mapping information may reflect that the data 701 stored in the physical unit 76 is valid data, while the data still stored in the physical unit 71 is invalid data. Next, in an exemplary embodiment of FIG. 7C, in response to the data 702 being stored in the physical unit 76, the physical unit 72 may also be immediately released as a new spare physical unit, and so on.

Conventionally, after activating a data merge operation (e.g., a garbage collection operation), the selection of the source unit is carefully calculated, and the physical unit selected as the source unit must be in a stable state. For example, the amount of valid data stored in multiple physical units selected as source units must be greater than or equal to the data capacity of one physical unit selected as the target unit. In this way, it is ensured that at least more than one spare physical unit may be released after one physical unit is full. In addition, physical units that are not currently in a stable state are not selected as source units, which may ensure that valid data may be stably collected from previously selected physical units during the execution period of the data merge operation.

However, in the exemplary embodiment provided in the disclosure, after activating the data merge operation, even if a certain first-type physical unit is not in a stable state, this first-type physical unit may still be selected as the source unit, as long as it may be ensured that this first-type physical unit is already in a stable state when it is the turn to collect data from this first-type physical unit. In this way, during the execution period of the data merge operation, even if the number of available first-type physical units is small, at least some of the first-type physical units may still be used to smoothly execute the host system write operation, thereby improving the operation stability of the memory storage device. For related operation examples, refer to the exemplary embodiments in FIG. 7A to FIG. 7F, and details are not repeated herein.

Figure 8:
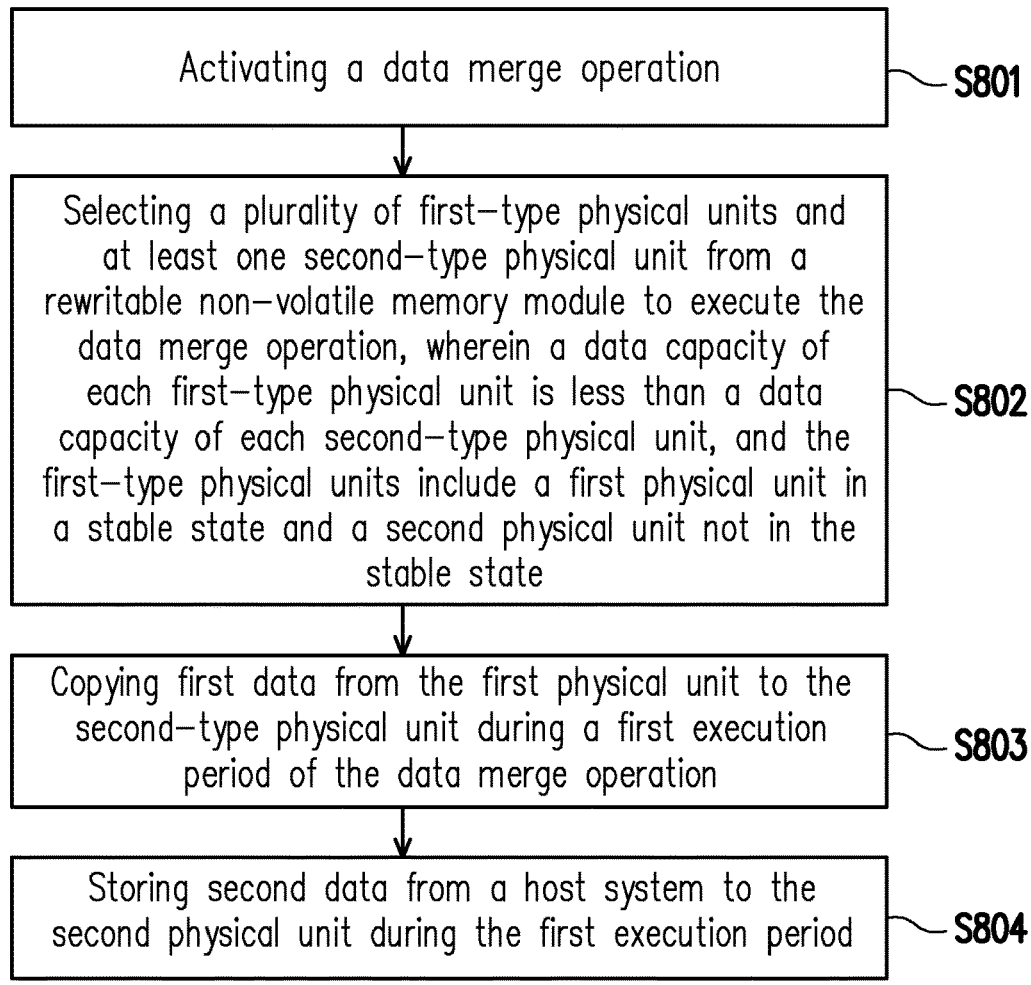
FIG. 8 is a flowchart of a memory management method according to an exemplary embodiment of the disclosure.

FIG. 8 is a flowchart of a memory management method according to an exemplary embodiment of the disclosure. Referring to FIG. 8, in step S801, the data merge operation is activated. In step S802, multiple first-type physical units and at least one second-type physical unit are selected from the rewritable non-volatile memory module to execute a data merge operation. The data capacity of each first-type physical unit is less than the data capacity of each second-type physical unit. In particular, the selected first-type physical units include first physical units in a stable state and second physical units that are not in the stable state. In step S803, during a first execution period of the data merge operation, the first data is copied from the first physical unit in a stable state among the first-type physical units to the second-type physical unit. In step S804, during the first execution period, the second data from the host system is stored in a second physical unit that is not in the stable state among the first-type physical units.

However, each step in FIG. 8 has been described in detail as above, and are not repeated herein. It should be noted that each of the steps in FIG. 8 may be implemented as multiple program codes or circuits, and the disclosure is not limited thereto. In addition, the method in FIG. 8 may be used in conjunction with the above-mentioned exemplary embodiments, or may be used alone, and the disclosure is not limited thereto.

To sum up, the memory management method, the memory storage device, and the memory control circuit unit provided in the exemplary embodiments of the disclosure may maintain the smooth execution of the synchronous host system write operation through a small number of first-type physical units in the data merge operation. Thereby, the usage efficiency of the first-type physical unit and/or the operation stability of the memory storage device may be effectively improved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A memory management method for a rewritable non-volatile memory module, the memory management method comprising:

activating a data merge operation;

selecting a plurality of first-type physical units and at least one second-type physical unit from the rewritable non-volatile memory module to execute the data merge operation, wherein a data capacity of each of the first-type physical units is less than a data capacity of each of the second-type physical unit, and the first-type physical units comprise a first physical unit in a stable state and a second physical unit not in the stable state, and each of the first-type physical units is configured as a source unit for collecting valid data currently or later in the data merge operation;

copying first data from the first physical unit to the at least one second-type physical unit during a first execution period of the data merge operation; and storing second data from a host system to the second physical unit configured as the source unit during the first execution period.

2. The memory management method according to claim 1, wherein after the second data is stored in the second physical unit, the second physical unit is transformed to be in the stable state, and the memory management method further comprises:

copying the second data from the second physical unit in the stable state to the at least one second-type physical unit during a second execution period of the data merge operation; and storing third data from the host system in a third physical unit not in the stable state among the first-type physical units.

3. The memory management method according to claim 1, wherein the first-type physical units are sequentially configured to store data from the host system according to a preset sequence during an execution period of the data merge operation.

4. The memory management method according to claim 3, wherein at least a portion of data stored in the first-type physical units is sequentially copied to the at least one second-type physical unit according to the preset sequence during an execution period of the data merge operation.

5. The memory management method according to claim 1, further comprising:
synchronously releasing a plurality of physical units, whose valid data stored in the first-type physical units have been completely copied, as spare physical units after the at least one second-type physical unit is full.

6. The memory management method according to claim 1, further comprising:
releasing the first physical unit as a spare physical unit after copying the first data from the first physical unit to the at least one second-type physical unit.

7. The memory management method according to claim 1, wherein a total amount of valid data stored in the first-type physical units that are selected is less than a data capacity of one physical unit in the at least one second-type physical unit.

8. A memory storage device, comprising:
a connection interface unit, configured to couple to a host system;
a rewritable non-volatile memory module; and
a memory control circuit unit, coupled to the connection interface unit and the rewritable non-volatile memory module,
wherein the memory control circuit unit is configured to:
activate a data merge operation;
select a plurality of first-type physical units and at least one second-type physical unit from the rewritable non-volatile memory module to execute the data merge operation, wherein a data capacity of each of the first-type physical units is less than a data capacity of each of the second-type physical unit, and the first-type physical units comprise a first physical unit in a stable state and a second physical unit not in the stable state, and each of the first-type physical units is configured as a source unit for collecting valid data currently or later in the data merge operation;
instruct to copy first data from the first physical unit to the at least one second-type physical unit during a first execution period of the data merge operation; and
instruct to store second data from the host system to the second physical unit configured as the source unit during the first execution period.

9. The memory storage device according to claim 8, wherein after the second data is stored in the second physical unit, the second physical unit is transformed to be in the stable state, and the memory control circuit unit is further configured to:
instruct to copy the second data from the second physical unit in the stable state to the at least one second-type physical unit during a second execution period of the data merge operation; and
instruct to store third data from the host system in a third physical unit not in the stable state among the first-type physical units.

10. The memory storage device according to claim 8, wherein the first-type physical units are sequentially configured to store data from the host system according to a preset sequence during an execution period of the data merge operation.

11. The memory storage device according to claim 10, wherein at least a portion of data stored in the first-type physical units is sequentially copied to the at least one second-type physical unit according to the preset sequence during an execution period of the data merge operation.

12. The memory storage device according to claim 8, wherein the memory control circuit unit is further configured to:
synchronously release a plurality of physical units, whose valid data stored in the first-type physical units have been completely copied, as spare physical units after the at least one second-type physical unit is full.

13. The memory storage device according to claim 8, wherein the memory control circuit unit is further configured to:
release the first physical unit as a spare physical unit after copying the first data from the first physical unit to the at least one second-type physical unit.

14. The memory storage device according to claim 8, wherein a total amount of valid data stored in the first-type physical units that are selected is less than a data capacity of one physical unit in the at least one second-type physical unit.

15. A memory control circuit unit, for controlling a rewritable non-volatile memory module, the memory control circuit unit comprising:
a host interface, configured to couple to a host system;
a memory interface, configured to couple to the rewritable non-volatile memory module; and
a memory management circuit, coupled to the host interface and the memory interface,
wherein the memory management circuit is configured to:
activate a data merge operation;
select a plurality of first-type physical units and at least one second-type physical unit from the rewritable non-volatile memory module to execute the data merge operation, wherein a data capacity of each of the first-type physical units is less than a data capacity of each of the second-type physical unit, and the first-type physical units comprise a first physical unit in a stable state and a second physical unit not in the stable state, and each of the first-type physical units is configured as a source unit for collecting valid data currently or later in the data merge operation;
instruct to copy first data from the first physical unit to the at least one second-type physical unit during a first execution period of the data merge operation; and
instruct to store second data from the host system to the second physical unit configured as the source unit during the first execution period.

16. The memory control circuit unit according to claim 15, wherein after the second data is stored in the second physical unit, the second physical unit is transformed to be in the stable state, and the memory management circuit is further configured to:
instruct to copy the second data from the second physical unit in the stable state to the at least one second-type physical unit during a second execution period of the data merge operation; and
instruct to store third data from the host system in a third physical unit not in the stable state among the first-type physical units.

17. The memory control circuit unit according to claim 15, wherein the first-type physical units are sequentially configured to store data from the host system according to a preset sequence during an execution period of the data merge operation.

18. The memory control circuit unit according to claim 17, wherein at least a portion of data stored in the first-type physical units is sequentially copied to the at least one second-type physical unit according to the preset sequence during an execution period of the data merge operation.

19. The memory control circuit unit according to claim 15, wherein the memory management circuit is further configured to:
   synchronously release a plurality of physical units, whose valid data stored in the first-type physical units have been completely copied, as spare physical units after the at least one second-type physical unit is full.

20. The memory control circuit unit according to claim 15, wherein the memory management circuit is further configured to:
   release the first physical unit as a spare physical unit after copying the first data from the first physical unit to the at least one second-type physical unit.

21. The memory control circuit unit according to claim 15, wherein a total amount of valid data stored in the first-type physical units that are selected is less than a data capacity of one physical unit in the at least one second-type physical unit.

* * * * *